United States Patent [19]

Ohishi et al.

[11] E Re. 31,322

[45] Reissued Jul. 26, 1983

[54] PROCESS FOR PRODUCING SULFUR-CURABLE ACRYLIC RUBBERS

[75] Inventors: Tetsu Ohishi, Tokyo; Kohichi Handa, Kamakura; Haruo Ueno, Tokyo, all of Japan

[73] Assignee: Nippon Zeon Co. Ltd., Tokyo, Japan

[21] Appl. No.: 304,788

[22] Filed: Sep. 23, 1981

Related U.S. Patent Documents

Reissue of:

[64] Patent No.: 4,228,265
Issued: Oct. 14, 1980
Appl. No.: 24,476
Filed: Mar. 27, 1979

[30] Foreign Application Priority Data

Mar. 27, 1978 [JP] Japan ..... 53-35050
Mar. 28, 1978 [JP] Japan ..... 53-35885

[51] Int. Cl.[3] ..... C08F 220/40

[52] U.S. Cl. ..... 526/230; 525/349; 525/351; 526/320; 526/327

[58] Field of Search ..... 525/327, 349, 351; 526/230, 320, 327

[56] References Cited

U.S. PATENT DOCUMENTS

| | | | |
|---|---|---|---|
| 3,201,373 | 8/1965 | Kaizerman | 526/36 |
| 3,476,722 | 11/1969 | Schlatzer | 526/327 |
| 3,622,547 | 11/1971 | Ermidis | 526/36 |
| 4,133,793 | 1/1979 | Lewis et al. | 526/320 |

*Primary Examiner*—Harry Wong, Jr.
*Attorney, Agent, or Firm*—Sherman & Shalloway

[57] ABSTRACT

A process for producing a sulfur-curable acrylic rubber is provided which comprises radical-copolymerizing (1) an alkyl acrylate with (2) an alkenyl acrylate or methacrylate, or radical-copolymerizing (1) an alkyl acrylate, (2) an alkenyl acrylate or methacrylate, (3) an alkoxyalkyl acrylate and optionally (4) acrylonitrile. These acrylic rubbers can be cured at a rate as fast as those for curing diene-type rubbers, and the cured products exhibit superior properties without long heat-treatment after curing.

10 Claims, 2 Drawing Figures

PROCESS FOR PRODUCING SULFUR-CURABLE ACRYLIC RUBBERS

Figure 1:
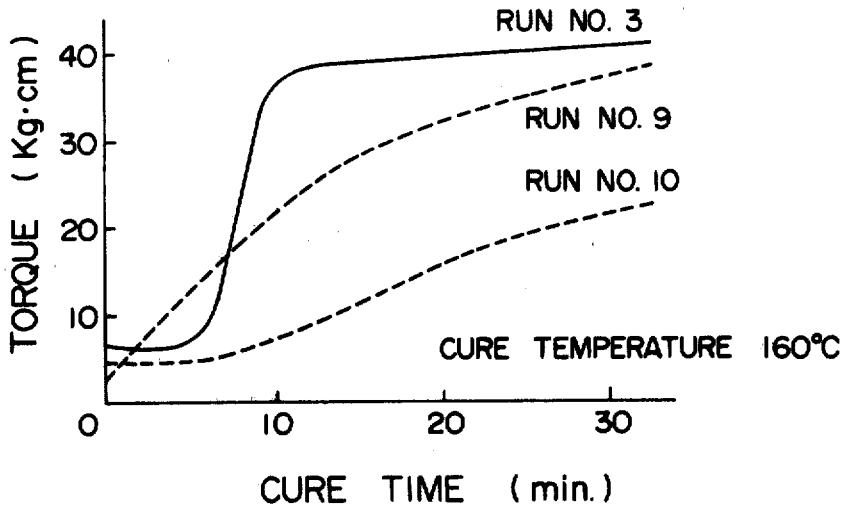

Matter enclosed in heavy brackets [ ] appears in the original patent but forms no part of this reissue specification; matter printed in italics indicates the additions made by reissue.

This invention relates to a process for producing an acrylic rubber which can be cured with sulfur.

Acrylic rubber is an elastomeric copolymer composed mainly of an acrylate unit, and is known to have superior heat resistance and oil resistance. Since it does not have a double bond at the main chain of the rubber molecules, a monomeric component having an active group capable of becoming a crosslinking site is usually copolymerized with it.

Monomers previously used as the monomeric component for providing crosslinking sites include, for example, halogen-containing monomers such as 2-chloroethyl vinyl ether, vinyl benzyl chloride, vinyl chloroacetate, allyl chloroacetate, and 5-chloroacetoxymethyl-2-norbornene, and epoxy monomers such as allyl glycidyl ether, glycidyl acrylate and glycidyl methacrylate.

Because these acrylic rubbers cannot be cured with ordinary sulfur (or sulfur-containing organic compound), vulcanization accelerator systems, amines, ammonium salts, metal soap/sulfur, etc. are generally used as a vulcanizer. Curing with these vulcanizers, however, has the defect that the rate of cure is slow, and to obtain vulcanizates of good properties, the cured products must be heat-treated for a very long period of time after curing.

Furthermore, when the amines or ammonium salts are used as the vulcanizer, unpleasantly odoriferous gases are generated in places where rubber products are made, thus causing a sanitary hazard. This also causes the defect that the cured products cannot be used in medical and foodstuff applications.

The use of the halogen-containing monomers as the crosslinking monomeric component may cause the corrosion of the mold at the time of curing, or the corrosion of metals with which the vulcanized products will make contact.

In an attempt to remove these defects, a method was suggested which involves copolymerization of an acrylate ester with such a crosslinking monomeric component as dicyclopentadiene, methylcyclopentadiene, ethylidene norbornene, vinylidene norbornene, butadiene, isoprene, allyl acrylate, 2-butenyl acrylate, methallyl acrylate, or triallyl isocyanurate to produce an acrylic rubber. The acrylic rubbers obtained by such a method are not entirely satisfactory for practical application because of one or more disadvantages. For example, the rate of cure is extremely slow, or the properties of the cured product are far from meeting the requirements of practical application. Or although the aforesaid problems are solved to some extent, the heat resistance and compression set of the products are still inferior to acrylic rubbers obtained by using the halogen-containing monomers or epoxy monomers as the crosslinking monomeric component.

It is an object of this invention therefore to provide sulfur-curable acrylic rubbers having superior compression set, which permit an improved rate of cure as fast as that for curing natural rubbers and diene-type synthetic rubbers and do not require long heat-treatment after curing, without sacrificing the superior heat resistance, oil resistance, weatherability and ozone resistance of conventional acrylic rubbers.

We have now found that this object can be achieved by using a certain alkenyl acrylate and/or an alkenyl methacrylate as a crosslinking component.

Thus, according to this invention, there is provided a process for producing a sulfur-curable acrylic rubber, which comprises copolymerizing in the presence of a radical initiator (1) 90 to 99.5% by weight of at least one alkyl acrylate with the alkyl group containing 1 to 8 carbon atoms and (2) 0.5 to 10% by weight, preferably 2 to 6% by weight, of at least one monomer of the general formula

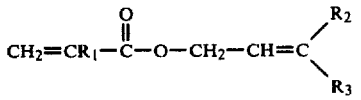

(I)

wherein $R_1$ represents a hydrogen atom or a methyl group, and $R_2$ and $R_3$, independently from each other, represent an alkyl group having 1 to 3 carbon atoms.

We have also found that when a part of the alkyl acrylate (1) is replaced by another monomer in the aforesaid process for producing acrylic rubber, there can be obtained an acrylic rubber which has a well balanced combination of cold resistance and oil resistance in addition to the aforesaid favorable properties.

Thus, according to another aspect, there is provided a process for producing a sulfur-curable acrylic rubber, which comprises copolymerizing in the presence of a radical initiator (1) 30 to 89.5% by weight of at least one alkyl acrylate with the alkyl group containing 1 to 8 carbon atoms, (2) 0.5 to 10% by weight, preferably 2 to 6% by weight, of at least one monomer of the general formula

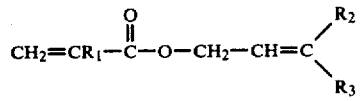

(I)

wherein $R_1$ represents a hydrogen atom or a methyl group, and $R_2$ and $R_3$, independently from each other, represent an alkyl group containing 1 to 3 carbon atoms, (3) 10 to 60% by weight, preferably 20 to 50% by weight, of at least one alkoxyalkyl acrylate with the alkoxy group containing 1 to 4 and the alkylene group containing 1 to 4 carbon atoms, and (4) 0 to 30% by weight, preferably 2 to 20% by weight, of acrylonitrile.

Examples of the alkyl acrylate (1) are methyl acrylate, ethyl acrylate, propyl acrylate, butyl acrylate, amyl acrylate, hexyl acrylate, cyclohexyl acrylate, and octyl acrylate. Those in which the alkyl group contains 2 to 4 carbon atoms are preferred; for example, they are ethyl acrylate, propyl acrylate and butyl acrylate.

Examples of the alkenyl acrylate and alkenyl methacrylate (2) of general formula (I) include 3-methyl-2-butenyl acrylate, 3-methyl-2-pentyl acrylate, and 3-methyl-2-hexenyl acrylate, and the corresponding methacrylates.

Acrylic rubbers made by the copolymerization of allyl acrylate or 2-butenyl acrylate with alkyl acrylates are known (U.S. Pat. No. 3,476,722). These acrylic rubbers, however, require long heat-treatment after curing as is the case with the conventional acrylic rubbers using the halogen-containing monomers or epoxy monomers as the crosslinking monomeric component, and the properties of the vulcanizates are not satisfactory for practical purposes. Moreover, acrylic rubbers obtained by the ternary copolymerization of allyl methacrylate, an alkyl acrylate and acrylonitrile are also known (Japanese Patent Publication No. 7893/72). But these acrylic rubbers have poor mechanical strength, and cannot find practical application.

When in accordance with this invention, at least one monomer of general formula (I) (i.e., an alkenyl acrylate or alkenyl methacrylate) is used as the crosslinking monomer, these defects can be markedly remedied. If the amount of the monomer (2) is less than 0.5% by weight, the rate of cure is extremely low, and vulcanizates having satisfactory properties for practical application cannot be obtained. If the amount of the monomer (2) exceeds 10% by weight, the cured product has very high hardness, and a greatly reduced elongation, and therefore, cannot be used satisfactorily as a rubber product.

Examples of the alkoxyalkyl acrylate (3) include methoxymethyl acrylate, methoxyethyl acrylate, ethoxyethyl acrylate, and butoxyethyl acrylate.

The acrylonitrile (4) is used in the aforesaid amounts when it is necessary to adjust the strength and oil resistance of the acrylic rubber of this invention.

The process of this invention can be easily performed by polymerizing a mixture of the monomers (1) and (2) or a mixture of the monomers (1), (2) and (3) and optionally (4) in the presence of a radical initiator by a known polymerization method (e.g., in emulsion, suspension, solution, bulk, etc.). The polymerization is performed batchwise, or while adding at least one component continuously and/or intermittently during the reaction. The polymerization temperature is preferably from −10° C. to +100° C., more preferably from 2° to 80° C.

The resulting acrylic rubber can be easily cured with sulfur vulcanization systems generally used for natural rubbers or diene-type synthetic rubbers, and this curing treatment does not require the very long heat-treatment after curing which is essential in the curing of ordinary acrylic rubbers having a halogen containing monomer or epoxy monomer as crosslinking sites. The cured products have superior heat resistance, weatherability and ozone resistance, and in some cases, a well balanced combination of cold resistance and oil resistance. Furthermore, the acrylic rubbers of this invention have markedly improved heat resistance and compression set over the known sulfur-curable acrylic rubbers.

In addition to the vulcanization system, various compounding agents such as reinforcing agents, fillers, plasticizers and antioxidants may be added to the rubbers of this invention as required.

The cured products of the acrylic rubbers of this invention are useful in many applications which require heat resistance, oil resistance, weatherability and ozone resistance. They include, for example, various rubber products such as gaskets, hoses, conveyor belts, packings, oil seals and valve seats.

The present invention is more specifically illustrated below with reference to Examples and the accompanying drawings.

Figure 2:
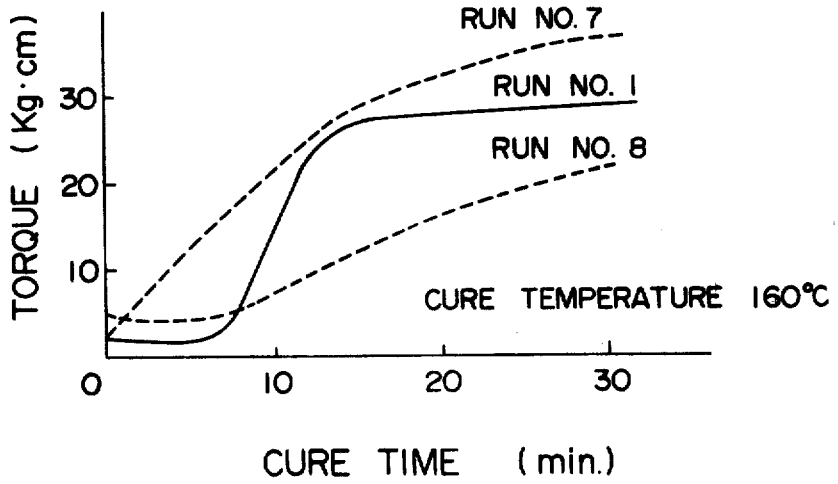

In the drawings,

FIG. 1 shows cure curves of acrylic rubbers obtained in Runs Nos. 3, 9 and 10 in Example 1 which were measured by means of an oscillating disc rheometer (a product of Toyo Seiki K.K.); and FIG. 2 show cure curves of acrylic rubbers obtained in Runs Nos. 1, 7 and 8 of Example 2 measured in the same way as described above. In these graphic representations, the abscissa represents the cure time (minutes), and the ordinates, the torque (kg.cm). The solid line refers to the example within the scope of this invention, and the broken lines, to comparisons.

EXAMPLE 1

A series of copolymers were produced by using the monomeric mixtures shown in Table 1. The method of polymerization was as follows:

A 2-liter separable flask equipped with a thermometer, a stirrer, a nitrogen introducing tube and an evacuation device was charged with a mixture of the following formulation.

| | |
|---|---|
| Water | 1,000 g |
| Sodium dodecylbenzenesulfonate | 20 g |
| Sodium naphthalenesulfonate | 10 g |
| Sodium sulfate | 3 g |
| Tetrasodium ethylenediamine-tetraacetate | 0.2 g |
| Ferrous sulfate | 0.005 g |
| Monomeric mixture (Table 1) | 1000 g |

The pH of the mixture was adjusted to 7, and with stirring, the temperature of the inside of the flask was maintained at 5° C. Furthermore, the inside of the flask was deoxygenated fully by using the nitrogen introducing tube and the evacuation device. Then, the following compounds were added, and the reaction was started.

$Na_2S_2O_4$:0.2 g

Sodium formaldehyde sulfoxylate: 0.2 g p-Menthane hydroperoxide: 0.1 g

The polymerization was terminated in about 16 hours. The polymerization conversion was within the range of 95 to 99% in each run. After the polymerization, the reaction mixture was salted out, washed with water, and dried under vacuum in a dryer to form the desired acrylic rubber.

TABLE 1

| Monomers (parts by weight) | Run No | | | | | | | | | |
|---|---|---|---|---|---|---|---|---|---|---|
| | Invention | | | | | Comparison | | | | |
| | 1 | 2 | 3 | 4 | 5 | 6 | 7 | 8 | 9 | 10 |
| Ethyl acrylate | 99 | 97 | 95 | 97 | 32 | 97 | 97 | 97 | 98 | 95 |
| Butyl acrylate | — | — | — | — | 65 | — | — | — | — | — |
| 3-Methyl-2-butenyl acrylate | 1 | 3 | 5 | — | 3 | — | — | — | — | — |
| Allyl acrylate | — | — | — | — | — | 3 | — | — | — | — |
| 2-Butenyl acrylate | — | — | — | — | — | — | 3 | — | — | — |
| Methallyl acrylate | — | — | — | — | — | — | — | 3 | — | — |
| Glycidyl methacrylate | — | — | — | — | — | — | — | — | 2 | — |
| 2-Chloroethylvinyl ether | — | — | — | — | — | — | — | — | — | 5 |

Using the 10 acrylic rubbers obtained, compounds were prepared by means of an open roll in accordance with the recipes shown in Table 2. The compounds were each press-cured at 160° C. for 20 minutes, and then heat-treated in a Geer oven at 150° C. for 4 hours and 16 hours, respectively.

TABLE 2

| Recipe (parts by weight) | Run No. | | |
|---|---|---|---|
| | 1-8 | 9 | 10 |
| Acrylic rubber | 100 | 100 | 100 |
| Stearic acid | 1 | 1 | 1 |

TABLE 2-continued

| Recipe (parts by weight) | Run No. 1-8 | 9 | 10 |
|---|---|---|---|
| HAF-LS carbon black | 60 | 60 | 60 |
| Zinc oxide No. 1 | 3 | — | — |
| Red lead | — | — | 5 |
| 2-Mercaptobenzimidazole | — | — | 1.5 |
| Ammonium benzoate | — | 1 | — |
| Tetramethylthiuram disulfide | 2 | — | — |
| 4,4'-Dithiomorpholine | 2 | — | — |
| N—cyclohexyl-2-benzothiazyl sulfenamide | 1 | — | — |

The properties of the cured products were measured in accordance with JIS K-6301, and the results are shown in Table 3.

The cure behaviors of a compound containing the acrylic rubber of this invention (Run No. 3) and compounds containing conventional acrylic rubbers including an epoxy monomer and a halogen-containing monomer as the crosslinking monomer (Runs Nos. 9 and 10) were measured by an oscillating disc rheometer. The relation between the curing time and the torque were plotted in FIG. 1.

TABLE 3-1

| Test items | Run No. Invention 1 | 2 | 3 | 4 | 5 | Comparison 6 | 7 | 8 | 9 | 10 |
|---|---|---|---|---|---|---|---|---|---|---|
| Properties after curing at 160° C. for 20 minutes | | | | | | | | | | |
| Tensile strength (kg/cm$^2$) | 121 | 153 | 152 | 111 | 140 | 64 | 73 | 70 | 106 | 98 |
| 100% Tensile stress (kg/cm$^2$) | 11 | 36 | 49 | 18 | 31 | 11 | 15 | 13 | 40 | 19 |
| Elongation (%) | 710 | 330 | 190 | 510 | 340 | 320 | 300 | 300 | 340 | 490 |
| Hardness (Shore A) | 50 | 67 | 69 | 54 | 65 | 48 | 52 | 50 | 63 | 58 |
| Compression set (%)(*) | 69 | 54 | 55 | 76 | 68 | 84 | 80 | 83 | 80 | 89 |

(*): Compression ratio 25%, 150° C. × 70 hours

TABLE 3-2

| Test items | Run No. Invention 1 | 2 | 3 | 4 | 5 | Comparison 6 | 7 | 8 | 9 | 10 |
|---|---|---|---|---|---|---|---|---|---|---|
| Properties after curing at 160° C. for 20 minutes and then heat-treatment at 150° C. for 4 hours | | | | | | | | | | |
| Tensile strength (kg/cm$^2$) | 134 | 149 | 149 | 120 | 139 | 67 | 81 | 73 | 113 | 119 |
| 100% Tensile stress (kg/cm$^2$) | 14 | 36 | 49 | 19 | 36 | 15 | 23 | 20 | 53 | 31 |
| Elongation (%) | 600 | 320 | 190 | 470 | 310 | 270 | 280 | 270 | 290 | 350 |
| Hardness (Shore A) | 54 | 67 | 69 | 57 | 67 | 54 | 58 | 55 | 66 | 62 |
| Compression set (%)(*) | 30 | 27 | 22 | 38 | 34 | 63 | 56 | 61 | 56 | 77 |
| Properties after curing at 160° C. for 20 minutes and then heat-treatment at 150° C. for 16 hours | | | | | | | | | | |
| Tensile strength (kg/cm$^2$) | Since the properties reached an equilibrium as a result of the curing at 160° C. for 20 minutes and heat treatment at 150° C. for 4 hours, the testing of the properties after the 16-hours heat-treatment was omitted | | | | | 69 | 70 | 68 | 134 | 137 |
| 100% Tensile stress (kg/cm$^2$) | | | | | | 21 | 29 | 25 | 69 | 62 |
| Elongation (%) | | | | | | 230 | 220 | 220 | 210 | 220 |
| Hardness (Shore A) | | | | | | 59 | 61 | 60 | 69 | 69 |
| Compression set (%)(*) | | | | | | 51 | 44 | 45 | 29 | 59 |

TABLE 3-3

| Test items | Run No. Invention 1 | 2 | 3 | 4 | 5 | Comparison 6 | 7 | 8 | 9 | 10 |
|---|---|---|---|---|---|---|---|---|---|---|
| Heat aging test (in Geer oven at 175° C. for 170 hours) (**) | | | | | | | | | | |
| Percent change in tensile strength (%) | −47 | −28 | −4 | −32 | −27 | −48 | −26 | −41 | +15 | −37 |
| Percent change in elongation (%) | +8 | ±0 | −8 | −15 | −7 | −48 | −32 | −50 | −20 | −43 |
| Change in hardness (point) | +12 | +11 | +12 | +15 | +13 | +20 | +18 | +20 | +9 | +8 |
| Heat aging test in oil (150° C. for 70 hours in ASTM No. 3 oil) (**) | | | | | | | | | | |
| Percent change in volume (%) | +17.0 | +15.1 | +13.6 | +16.2 | +26.3 | +16.5 | +16.0 | +16.5 | +16.7 | +17.8 |
| Cold resistance test (low-temperature torsion test in JIS K-6301 (**) | | | | | | | | | | |
| T-10 (°C.) | −12.0 | −10.0 | −9.5 | −10.0 | −21.0 | −10.0 | −10.0 | −10.0 | −10.0 | −10.0 |

(**): In Runs Nos. 1 to 8 samples cured at 160° C. for 20 minutes (not heat-treated subsequently) were used, and in Runs Nos. 9 and 10, samples cured at 160° C. for 20 minutes and then heat-treated at 150° C. for 16 hours were used.

It is seen from FIG. 1 that while the conventional acrylic rubbers (Runs Nos. 9 and 10) cure very slowly, the acrylic rubber of this invention (Run No. 3) cures very rapidly after starting of vulcanization and then reaches an equilibrium, thus exhibiting the same vulcanization behavior as a diene-type rubber. Hence, the acrylic rubber of the invention shows satisfactory properties for practical application when cured at 160° C. for 20 minutes, and its compression set is improved by heat-treatment at 150° C. for as short as 4 hours. To obtain vulcanizates having properties equivalent to the acrylic rubber of this invention, the conventional acrylic rubbers must be heat-treated at 150° C. for as long as 16 hours.

Acrylic rubbers including allyl acrylate, 2-butenyl acrylate, and methallyl acrylate (Runs Nos. 6, 7 and 8, respectively) have very poor roll processability, and even when heat-treated in the same way as in the case of the conventional acrylic rubbers, cannot have satisfactory vulcanization properties for practical application.

It is appreciated from the experimental results given above that the acrylic rubber of this invention is an acrylic rubber of very good quality which shows equivalent or better vulcanization properties to or than the conventional acrylic rubbers without performing the long heat-treatment which is essential to the vulcanization of the conventional acrylic rubbers.

EXAMPLE 2

A 2-liter separable flask equipped with a thermometer, a stirrer, a nitrogen introducing tube and an evacuation device was charged with a mixture of recipe (I) below. The pH of the mixture in the flask was adjusted to 7, and with stirring, the temperature of the inside of the flask was maintained at 5° C. The oxygen in the flask was sufficiently removed by repeated deaeration and nitrogen introduction. Then, a mixture of recipe (II) below was added, and the polymerization was started. The polymerization was terminated in about 16 hours. The polymerization conversion was within the range of 95 to 99% in each run. After the polymerization, the product was salted out, washed thoroughly with water, and dried under reduced pressure in a dryer to obtain the desired acrylic rubber.

Polymerization Recipe

Recipe (I)

| | |
|---|---|
| Water | 1000 g |
| Sodium dodecylbenzenesulfonate | 20 g |
| Sodium naphthalenesulfonate | 10 g |
| Sodium sulfate | 3 g |
| Tetrasodium ethylenediamine-tetraacetate | 0.2 g |
| $FeSO_4$ | 0.005 g |
| Monomeric mixture (Table 4) | 1000 g |

Recipe (II)

| | |
|---|---|
| $Na_2S_2O_4$ | 0.2 g |
| Sodium formaldehyde sulfoxylate | 0.2 g |
| p-Menthane hydroperoxide | 0.1 g |

TABLE 4

| Monomers (parts by weight) | Run No. Invention 1 | 2 | 3 | 4 | 5 | 6 | Comparison 7 | 8 |
|---|---|---|---|---|---|---|---|---|
| Ethyl acrylate | 53 | 47 | 37 | — | 52 | 52 | 98 | 95 |
| Butyl acrylate | 25 | 15 | — | 47 | 20 | 25 | — | — |
| Methoxyethyl acrylate | 20 | 35 | 60 | 50 | 20 | 20 | — | — |
| Acrylonitrile | — | — | — | — | 5 | — | — | — |
| 3-Methyl-2-butenyl acrylate | 3 | 3 | 3 | 3 | 3 | — | — | — |
| 3-Methyl-2-hexenyl acrylate | — | — | — | — | — | 3 | — | — |
| Glycidyl methacrylate | — | — | — | — | — | — | 2 | — |
| 2-Chloroethylvinyl ether | — | — | — | — | — | — | — | 5 |

Using the 8 acrylic rubbers so obtained, compounds were prepared by means of an open roll under cooling in accordance with the recipes shown in Table 5, and then each press-cured at 160° C. for 20 minutes. Then, the cured products were each heat-treated in a Geer oven at 150° C. for 4 hours, and 16 hours, respectively.

TABLE 5

| Recipe (parts by weight) | Run No. Invention 1–6 | Comparison 7 | 8 |
|---|---|---|---|
| Acrylic rubber | 100 | 100 | 100 |
| Stearic acid | 1 | 1 | 1 |
| HAF-LS carbon black | 60 | 60 | 60 |
| Zinc oxide No. 1 | 3 | — | — |
| Red lead | — | — | 5 |
| 2-Mercapto benzimidazole | — | — | 1.5 |
| Ammonium benzoate | — | 1 | — |
| Tetramethyl thiuram disulfide | 2 | — | — |
| 4,4'-Dithiomorpholine | 2 | — | — |
| N—Cyclohexyl-2-benzothiazyl sulfenamide | 1 | — | — |

The properties of the cured products were measured in accordance with JIS K-6301, and the results are shown in Table 6.

The vulcanization behaviors of a compound containing the acrylic rubber of this invention (Run No. 1) and compounds containing the comparative acrylic rubbers (Runs Nos. 7 and 8) were measured in the same way as in Example 1, and the results were plotted in FIG. 2.

TABLE 6-1

| Test items | Run No. Invention 1 | 2 | 3 | 4 | 5 | 6 | 7 | 8 |
|---|---|---|---|---|---|---|---|---|
| Properties after curing at 160° C. for 20 minutes | | | | | | | | |
| Tensile strength (kg/cm²) | 122 | 126 | 134 | 98 | 148 | 103 | 106 | 98 |
| 100% Tensile stress (kg/cm²) | 35 | 34 | 35 | 38 | 37 | 36 | 40 | 19 |
| Elongation (%) | 290 | 300 | 310 | 240 | 320 | 240 | 340 | 490 |
| Hardness (Shore A) | 66 | 66 | 66 | 67 | 67 | 67 | 63 | 58 |
| Compression set (%) (*) | 63 | 68 | 67 | 62 | 59 | 73 | 80 | 89 |

(*):Compression ratio 25%, 150° C. × 70 hours

TABLE 6-2

| Test items | Run No. Invention 1 | 2 | 3 | 4 | 5 | 6 | Comparison 7 | 8 |
|---|---|---|---|---|---|---|---|---|
| Properties after curing at 160° C. for 20 minutes and then heat-treatment at 150° C. for 4 hours | | | | | | | | |
| Tensile strength (kg/cm$^2$) | 119 | 124 | 131 | 103 | 141 | 107 | 113 | 119 |
| 100% Tensile stress (kg/cm$^2$) | 35 | 34 | 34 | 39 | 38 | 39 | 53 | 31 |
| Elongation (%) | 290 | 300 | 310 | 240 | 310 | 220 | 290 | 350 |
| Hardness (Shore A) | 66 | 66 | 66 | 67 | 67 | 67 | 66 | 62 |
| Compression set (%) (*) | 30 | 33 | 31 | 37 | 32 | 39 | 56 | 77 |
| Properties after curing at 160° C. for 20 minutes and then heat-treatment at 150° C. for 16 hours | | | | | | | | |
| Tensile strength (kg/cm$^2$) | Since the properties reached an equilibrium as a result of the curing at 160° C. for 20 minutes and heat treatment at 150° C. for 4 hours, the testing of the properties after the 16-hour heat-treatment was omitted | | | | | | 134 | 137 |
| 100% Tensile stress (kg/cm$^2$) | | | | | | | 69 | 62 |
| Elongation (%) | | | | | | | 210 | 220 |
| Hardness (Shore A) | | | | | | | 69 | 69 |
| Compression set (%) (*) | | | | | | | 29 | 59 |

TABLE 6-3

| Test items | Run No. Invention 1 | 2 | 3 | 4 | 5 | 6 | Comparison 7 | 8 |
|---|---|---|---|---|---|---|---|---|
| Heat aging test in oil (150° C. for 70 hours in ASTM No. 3 oil) (**) | | | | | | | | |
| Percent change in volume (%) | +18.9 | +13.8 | +8.5 | +22.4 | +14.2 | +19.7 | +16.7 | +17.8 |
| Cold resistance test (low-temperature torsion test in JIS 6301) (**) | | | | | | | | |
| T-10 (°C.) | −21 | −21.5 | −23.5 | −34.5 | −16 | −21.5 | −10 | −10 |

(**): In Runs Nos. 1 to 8, samples cured at 160° C. for 20 minutes (not heat-treated subsequently) were used, and in Runs Nos. 9 and 10, samples cured at 160° C. for 20 minutes and then heat-treated at 150° C. for 16 hours were used.

It is seen from FIG. 2 that while the conventional acrylic rubbers cure slowly, the acrylic rubber of this invention exhibits a vulcanization behavior equivalent to a diene-type rubber. Accordingly, as shown in Table 6, while the conventional acrylic rubbers require heat-treatment at 150° C. for as long as 16 hours after the curing, the acrylic rubber of this invention affords cured products having equivalent characteristics to the conventional acrylic rubbers by heat-treatment at 150° C. for as short as 4 hours. Moreover, the acrylic rubbers of this invention have markedly improved heat resistance and compression set over the conventional sulfur-curable acrylic rubbers, and exhibit a well balanced combination of cold resistance and oil resistance.

According to this invention, therefore, the slow cure rate of the conventional acrylic rubbers can be increased to a level equivalent to that of diene-type rubbers without impairing the good heat resistance, oil resistance, weatherability, ozone resistance and cold resistance of the conventional acrylic rubbers, and acrylic rubbers having a low compression set and a well balanced combination of cold resistance and oil resistance can be obtained.

What we claim is:

1. A process for producing a sulfur-curable acrylic rubber, which comprises copolymerizing in the presence of a radical initiator (1) 90 to 99.5% by weight of at least one alkyl acrylate with the alkyl group containing 1 to 8 carbon atoms, and (2) 0.5 to 10% by weight of at least one monomer of the general formula

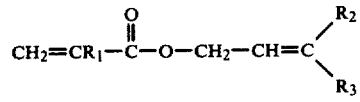

wherein $R_1$ represents a hydrogen atom or a methyl group, and $R_2$ and $R_3$, independently from each other, represent an alkyl group containing 1 to 3 carbon atoms.

2. A process for producing a sulfur-curable acrylic rubber, which comprises copolymerization in the presence of a radical initiator (1) 30 to 89.5% by weight of at least one alkyl acrylate with the alkyl group containing 1 to 8 carbon atoms, (2) 0.5 to 10% by weight of at least one monomer of the general formula

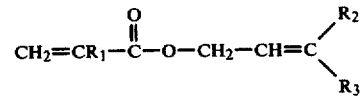

wherein $R_1$ represents a hydrogen atom or a methyl group, and $R_2$ and $R_3$, independently from each other, represent an alkyl group containing 1 to 3 carbon atoms, (3) 10 to 60% by weight of at least one alkoxyalkyl acrylate with the alkoxy group containing 1 to 4 carbon atoms and the alkylene group containing 1 to 4 carbon atoms, and (4) 0 to 30% by weight of acrylonitrile.

3. The process of claim 1 or 2 wherein the monomer (2) represented by the general formula is 3-methyl-2-butenyl acrylate.

4. The process of claim 1 or 2 wherein the monomer (2) represented by the general formula is 3-methyl-2-butenyl methacrylate.

5. The process of claim 1 or 2 wherein the copolymerization is carried out in emulsion.

6. The process of claim 1 or claim 2 wherein the alkyl group of the alkyl acrylate contains 2 to 4 carbon atoms.

7. The process of claim 1 or claim 2 wherein the monomer (2) is present in an amount of from about 2% to about 6% by weight.

8. The process of claim 2 wherein the alkoxyacrylate is present in an amount of from about 20% to about 50% by weight.

9. The process of claim 2 wherein acrylonitrile is present in an amount of from about 2% to about 20% by weight.

10. The process of claim 1 or claim 2 wherein the radical initiator is p-menthane hydroperoxide.

* * * * *